United States Patent

Bresson et al.

[15] 3,650,489

[45] Mar. 21, 1972

[54] GEAR DRIVE FOR A CAMERA AND FILM CARTRIDGE

[72] Inventors: Richard J. Bresson; James E. Dierks, both of Rochester, N.Y.

[73] Assignee: Eastman Kodak Company, St. Louis, Mo.

[22] Filed: Apr. 6, 1970

[21] Appl. No.: 26,014

[52] U.S. Cl. ............................. 242/71.2, 95/31 R, 242/71.4
[51] Int. Cl. ............................................................ G03b 1/10
[58] Field of Search ..................... 242/71.4, 71.2; 95/3.1 R; 352/72, 78 R, 78 C

[56] References Cited

UNITED STATES PATENTS

| | | | |
|---|---|---|---|
| 2,172,337 | 9/1939 | Mihalyl | 242/71.4 X |
| 2,246,034 | 6/1941 | Elison | 242/71.4 |
| 2,911,894 | 11/1959 | Hennig | 95/31 X |
| 3,451,322 | 6/1969 | Noda | 95/31 |

*Primary Examiner*—George F. Mautz
*Assistant Examiner*—Edward J. McCarthy
*Attorney*—Robert W. Hampton and D. Peter Hochberg

[57] ABSTRACT

A film cartridge housing encloses a core which is rotatably mounted therein. The housing extends over a gear carried by the spool and defines an opening through which a camera driving gear is insertable for engaging the spool gear and rotating the spool. In a preferred embodiment, the gear axes define a plane which is offset from a normal to the film plane by an angle equal to the pressure angle of the gears, thereby creating a line of force parallel to the film plane. By arranging for such line of force to pass through a cartridge-supporting surface in the camera at a position where the film cartridge contacts the surface, any tendency of the cartridge to be unseated from the supporting surface in response to the creation of a force component normal to the film plane is negated.

5 Claims, 3 Drawing Figures

PATENTED MAR 21 1972

RICHARD J. BRESSON
JAMES E. DIERKS
INVENTORS

BY D. Peter Hochberg
Robert W. Hampton

ATTORNEYS

GEAR DRIVE FOR A CAMERA AND FILM CARTRIDGE

CROSS-REFERENCES TO RELATED APPLICATIONS

Reference is made to commonly assigned copending U.S. Pat. application, Ser. Nos. 26,015 and 25,957, each entitled "- Gear Drive for a Camera and Film cartridge," filed on even date herewith in the names of David E. Beach and Evan A. Edwards, respectively.

BACKGROUND OF THE INVENTION

1. Field of the Invention

The present invention relates generally to film cartridges and the means for transporting film loaded therein. More particularly, the invention relates to a gear driven film cartridge for effecting the transportation of film loaded in the cartridge, and to a camera for receiving such a cartridge.

2. Description of the Prior Art

The film cartridges currently in wide use comprise film supply and takeup chambers connected by a wall member, and are receivable in cameras as a unitary package. Film is transported to the takeup compartment of many cartridges by rotating a core in the takeup compartment to wind film thereon. In many of these cartridges, the core is rotated by a camera drive member which is in axial alignment with the core and which is in endwise engagement therewith. As a result, the camera must be high enough to accommodate the drive member, thus rendering it relatively cumbersome. Moreover, a mechanism must usually be provided to withdraw the camera drive member from the insertion and removal path of the cartridge to permit loading and unloading of the camera.

U.S. Pat. No. 3,296,949, issued Jan. 10, 1967 to W. E. Bounds, discloses a camera and a film magazine having a gear driven takeup spool wherein a camera drive gear and the spool gear are in an adjacent coplanar relationship when engaged, with the axes of the driven gear of the magazine and of the driving gear of the camera lying in a plane which is offset from a normal to the film plane. However, the orientation of the driven and driving gears of the magazine loaded camera is such that, upon engagement of the gears, a rearwardly directed force is created which tends to unseat the magazine and move the film from the focal plane of the camera. There is no suggestion that any countervailing reasons exist for the selection of the chosen angle of offset of the driving and driven gears. In addition, aside from an opening in the magazine casing providing access to the magazine gear, there is an absence of any means for facilitating the initial engagement of the camera gear with the magazine gear, thus making precise alignment of the gears necessary to effect their engagement. Furthermore, the magazine gear periphery is located close enough to the access opening so that inadvertent manual rotation thereof, with resultant undesired film advance, is possible. The diameter of the magazine gear is about the same as the inner diameter of the takeup chamber in which the gear is located, and the magazine casing is large enough to contain the gear.

Commonly assigned U.S. Pat. No. 2,172,337, issued Sept. 5, 1939 to J. Mihalyi, discloses a roll film camera with a gear driven cartridge. The cartridge gear is not enclosed in the cartridge housing, but is partially exposed therefrom. The driving and driven gears are offset angularly from the normal to the film plane, but the criteria for selection of the offset is not suggested. Again, by virtue of the direction of such offset, a force is created in response to pressure between the gears tending to displace the film cartridge rearwardly in the camera, necessitating the employment of sufficiently sturdy camera elements to counterbalance the unseating force.

SUMMARY OF THE INVENTION

It is an object of the present invention to provide a gear driven film cartridge having a partially enclosed gear, rotatable in response to a rotation of a cooperating camera driving gear, for transporting film in the cartridge, wherein the gear enclosure defines guide surfaces for facilitating access of the camera gear to the cartridge gear.

A related object of the invention is to provide such a gear cartridge wherein the gear is sufficiently protected to prevent the inadvertent manual displacement thereof.

A further object of the present invention is to provide a compact film cartridge comprising a minimal number of parts, which cartridge is economical to manufacture and easy to use.

In accordance with a preferred embodiment of the present invention, the housing of a gear driven film cartridge encloses a rotatable core having a gear at one end. The cartridge gear has a diameter substantially smaller than the takeup chamber in which the core is located, and is engageable by a camera driving gear through an opening in the cartridge housing for effecting the rotation of the core. This opening is defined by tapered surfaces for directing the gears into engagement. The gear is sufficiently enclosed by the housing to render it manually inaccessible. When the cartridge is received in the camera, a plane defined by the axes of the driving and driven gears is offset from the normal to the film plane in such a manner as to minimize the tendency of the force created by pressure between the gears to unseat the film cartridge from a support surface in the camera.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DETAILED DESCRIPTION OF THE INVENTION

Because cameras and film cartridges are well known, the present description will be directed in particular to camera and cartridge elements forming part of, or cooperating more directly with, apparatus in accordance with the present invention. It is to be understood that camera and cartridge elements not specifically shown or described may take various forms well known to those skilled in the art.

Figure 1:
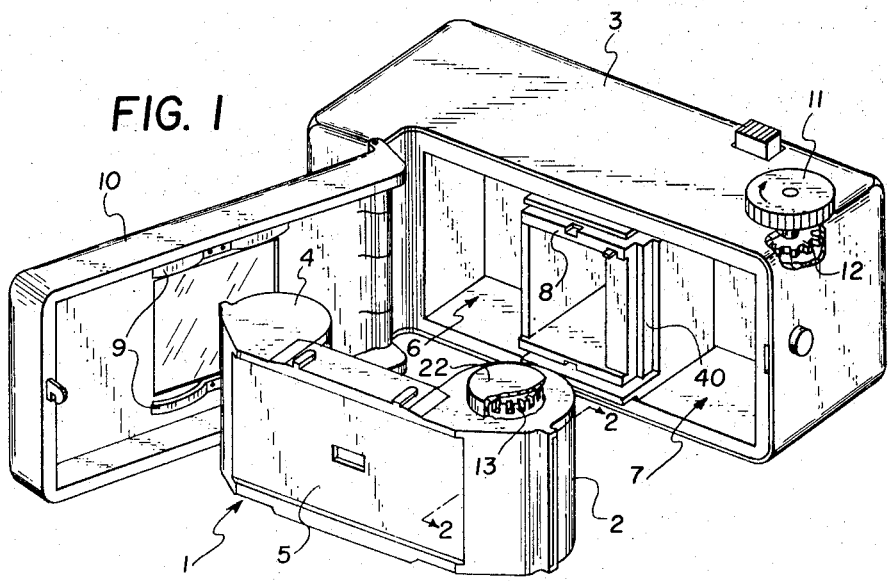
FIG. 1 is a perspective view of a film cartridge and camera according to the invention.

A film cartridge 1 is shown in FIG. 1 in position for insertion into a camera 3 and comprises a film supply compartment 4, a wall 5 defining a film plane on the forward face thereof, and a film takeup compartment 2. Camera 3 includes chambers 6 and 7 for receiving the supply and takeup compartments, respectively, of film cartridge 1. Film cartridge 1 is accurately located with respect to the focal plane of the camera objective (not shown) by means of horizontal support members 8, and vertical stepped support members 40, which members engage corresponding structure 41 in cartridge 1 (see FIG. 3). A received cartridge is urged into engagement with members 8 and 40 by leaf springs 9 mounted on the interior of a camera door 10, which is hinged to the rearward part of camera 3 in a conventional manner. The camera film advance mechanism comprises a manually operable knob 11 to which is attached a driving gear 12, gear 12 being engageable with a gear 13 connected to a core in takeup chamber 2, in a manner and for reasons to be described hereinafter.

Figure 2:
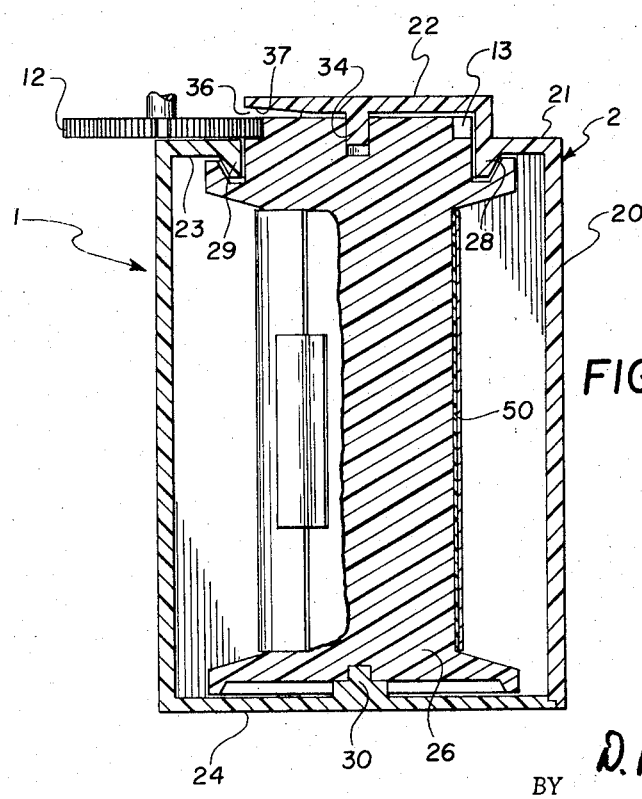
FIG. 2 is a section through line 2—2 in FIG. 1 as it would appear when the cartridge is loaded in the camera, with a camera drive gear shown in engagement with a cartridge gear.

The section through the line 2—2 of FIG. 1, illustrated in FIG. 2, indicates that takeup chamber 2 comprises a cylindrical casing 20, a top wall 21 including a gear cover 22 and a portion 23, and a bottom wall 24. Enclosed in takeup chamber 2 is a film core 26 having an annular recess at its upper end in a mating relationship with guide members 28 and 29 to form a labyrinth light seal at the upper end of chamber 2, and another recess at its lower end by means of which core 26 is journalled on post 30. Integral with the film spool 26 is gear 13 which, when rotated, drives core 26 to wind film 50 from supply chamber 4 onto core 26. Gear cover 22 extends over gear 13 to an extent sufficient to render gear 13 manually inaccessible, and has extending therefrom a post 34 which serves as a bearing for gear 13. The diameter of gear 13 is substantially less than the diameter of takeup chamber 2, and gear cover 22 is only large enough to fulfill its function, thereby maintaining the compactness of the cartridge. Wall portion 23 and gear cover 22 define an opening 36 through which driving gear 12 in camera 3 is given access to gear 13 for engagement therewith. The end portion 37 of gear cover 22 is tapered to guide driving gear 12 through opening 36 and into engagement with gear 13. Preferably, compartment 7 of camera 3 is so structured that, upon insertion of film cartridge 2 into camera 3, gears 12 and 13 necessarily become engaged.

For purposes of economy of manufacture, the housing shown consists of only two sections. One section includes part of side wall 20, gear cover 22, guide member 28 and bearing post 34, and the other section includes the remaining part of side wall 20, guide member 29, wall portion 23, post 30, and wall 24. These components are preferably made from molded plastic, but other suitable materials and methods will readily occur to those skilled in the art.

Figure 3:
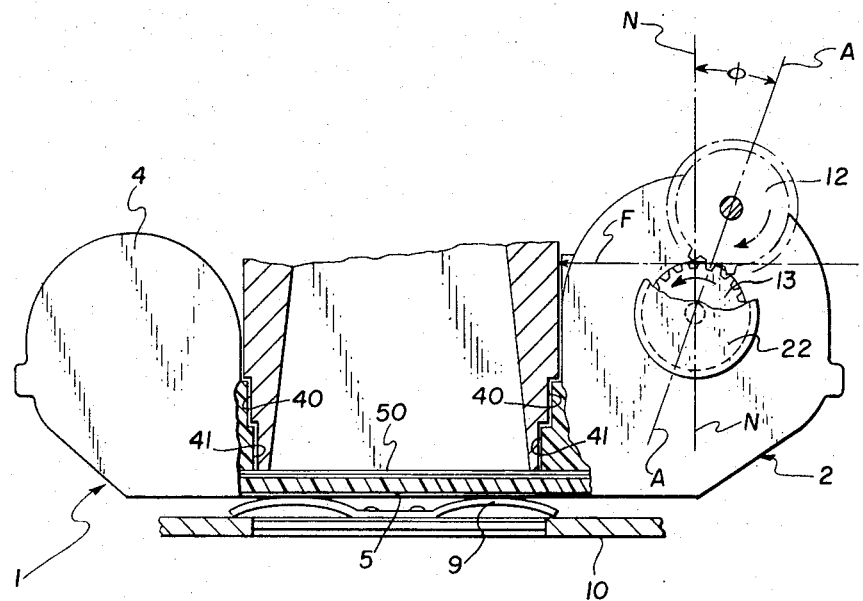
FIG. 3 is a schematic illustration of a top view of a film cartridge loaded in a camera, with portions cut away to expose the gear train.

Referring now to FIG. 3, film cartridge 2 is shown loaded in camera 3 and positioned on support members 40 of the camera. Leaf springs 9 fastened to camera door 10 urge cartridge 2 against camera support members 40. Gear cover 22 of takeup chamber 2 is cut away in FIG. 3 in order to reveal core gear 13 and camera driving gear 12. As indicated by the directional arrow on core gear 13, that gear must be rotated in a counterclockwise direction to wind film on core 26. Accordingly, knob 11 (FIG. 1) must be rotated in a clockwise direction to similarly rotate drive gear 12 to effect the proper displacement of gear 13. Gears 12 and 13 have a pressure angle of 20°, but of course other gear angles could be used. By rotating the plane A—A defined by the axes of rotation of driving gear 12 and core gear 13 from a normal N—N to the film plane by 20°, so that the angle of offset $\phi$ equals the pressure angle of the gears, the directional force F resulting from the driving engagement of gears 12 and 13 is parallel to the film plane. The absence of a resulting force normal to the film plane negates the necessity of providing means for offsetting such a force in order to prevent the unseating of the film cartridge from support members 40. Film cartridge 2 is contoured so that the outer surface of cylindrical casing 20 contacts one support member 40 in the path of the line of force F, thus obviating the creation of a moment by the force F, and accordingly obviating the need for providing a counterbalancing moment to avoid unseating of film cartridge 2 by such a moment. Of course, if the line of force F passes near the point of contact, a slight moment will be created, which if minimal, is easily counterbalanced by springs 9.

It can be seen that each of the objects of the invention has been accomplished. A gear driven film cartridge including gears selected and located as explained above, has been provided wherein the forces and moments resulting from the engagement of the gears are minimized, so that the mechanism for holding the film cartridge in place in the camera can be lighter, and more compact. Operation of the invention is simple, requiring the mere insertion of the cartridge into the camera and actuation of the camera drive mechanism.

The invention has been described in detail with particular reference to a preferred embodiment thereof, but it will be understood that variations and modifications can be effected within the spirit and scope of the invention.

We claim:
1. A film cartridge adapted for use in apparatus having a drive member, the cartridge comprising:
  means defining a takeup chamber;
  a takeup core rotatably mounted in said takeup chamber;
  a gear drivingly connected to said takeup core, at least a portion of said gear being outside said takeup chamber; and
  a cover for said gear, said cover including (1) a plurality of walls partially enclosing said gear to avoid inadvertent displacement of said gear and (2) an opening to provide access to said gear from outside the cartridge, said opening being tapered outwardly to a larger dimension for guiding the drive member into engagement with said gear.
2. A cartridge as set forth in claim 1 wherein:
  said takeup core and said gear are mounted for rotation about a common axis; and
  said opening is disposed radially of said axis.
3. A film cartridge adapted for use in apparatus having a drive member, the cartridge comprising:
  means defining a takeup chamber;
  a takeup core rotatably mounted in said takeup chamber;
  a gear having a root diameter and being drivingly connected to said takeup core, at least a portion of said gear being outside said takeup chamber; and
  a cover for said gear, said cover including (1) a plurality of walls partially enclosing said gear to avoid inadvertent displacement of said gear and (2) an opening to provide access to said gear from outside the cartridge, at least one of said walls being undercut in a region from its edge substantially to the root diameter of said gear thereby making said one wall dimensionally thinner in said region to ease positioning of the drive member into engagement with said gear.
4. A cartridge as set forth in claim 3 wherein:
  said takeup core and said gear are mounted for rotation about a common axis; and
  said opening is disposed radially of said axis.
5. A film cartridge adapted for use in apparatus having a drive member, the cartridge comprising:
  wall means defining a generally cylindrically shaped takeup chamber;
  a takeup core rotatably mounted in said takeup chamber;
  a gear drivingly connected to said takeup core, said gear (1) being substantially concentric with said takeup chamber, (2) having a diameter substantially less than the diameter of said takeup chamber, and (3) extending axially beyond said wall means outside said takeup chamber; and
  a generally cylindrically shaped cover on said wall means substantially concentric with said gear and said takeup chamber to enclose said gear, said cover (1) having a diameter substantially less than said takeup chamber but substantially greater than said gear and (2) defining with said wall means an opening disposed radially of said gear, whereby (1) said gear is substantially recessed behind the said opening and (2) said gear is substantially inaccessible accidently so as to avoid inadvertent displacement thereof but is readily accessible by the drive member to permit engagement thereby.

* * * * *